United States Patent [19]

Binnewirtz

[11] Patent Number: 5,524,335
[45] Date of Patent: Jun. 11, 1996

[54] METHOD OF MAKING A FIELD CONTROL ELEMENT

[75] Inventor: Ralf-Juergen Binnewirtz, Krefeld, Germany

[73] Assignee: RXS Schrumpftechnik-Garnituren GmbH, Hagen, Germany

[21] Appl. No.: 232,330

[22] Filed: Apr. 25, 1994

Related U.S. Application Data

[63] Continuation of Ser. No. 975,992, Nov. 13, 1992, abandoned, which is a continuation of Ser. No. 599,989, Oct. 19, 1990, abandoned.

[30] Foreign Application Priority Data

Jan. 9, 1990 [DE] Germany ............... 40 00 455.4

[51] Int. Cl.$^6$ ............................................. H01B 19/00
[52] U.S. Cl. .......................... 29/887; 156/53; 174/73.1; 252/511; 252/512
[58] Field of Search ............. 174/73.1, 80; 156/53; 252/511, 516, 512; 29/631

[56] References Cited

U.S. PATENT DOCUMENTS

| | | | |
|---|---|---|---|
| 3,210,460 | 10/1965 | Suelmann | 174/73.1 |
| 3,573,210 | 3/1971 | Furusawa et al. | |
| 3,576,387 | 4/1971 | Derby | 252/511 X |
| 3,631,519 | 12/1971 | Salahshourian | 174/73.1 |
| 3,816,347 | 6/1974 | Luh | 252/511 |
| 3,950,604 | 4/1976 | Penneck | 174/73.1 X |
| 3,963,647 | 6/1976 | Straub | 252/511 |
| 4,071,652 | 1/1978 | Brullo | 428/323 |
| 4,187,389 | 2/1980 | Foote et al. | 174/73.1 |
| 4,252,692 | 2/1981 | Taylor et al. | 252/504 |
| 4,275,261 | 6/1981 | Fillie | 174/73.1 |
| 4,363,842 | 12/1982 | Nelson | 174/73.1 |
| 4,378,463 | 3/1983 | Senior et al. | 174/73.1 |
| 4,431,861 | 2/1984 | Clabburn et al. | 174/73.1 |
| 4,458,103 | 7/1984 | Irie et al. | 174/73.1 X |
| 4,487,994 | 12/1984 | Bahder | 174/73.1 |
| 4,551,915 | 11/1985 | Larsson | 174/73.1 X |
| 4,667,401 | 5/1987 | Clements et al. | 252/511 X |
| 4,696,764 | 9/1987 | Yamazaki | 252/512 X |
| 4,738,318 | 4/1988 | Boettcher et al. | 174/73.1 |
| 4,929,391 | 5/1990 | Kroupa | 252/511 |
| 4,935,467 | 6/1990 | Cheng et al. | 252/511 X |
| 5,028,354 | 6/1991 | Smith et al. | 252/512 X |

FOREIGN PATENT DOCUMENTS

| | | |
|---|---|---|
| 2287793 | 5/1976 | France . |
| 2307351 | 11/1976 | France . |
| 2547451 | 12/1984 | France . |
| 1526397 | 9/1978 | United Kingdom . |
| 1534003 | 11/1978 | United Kingdom . |

*Primary Examiner*—Carl J. Arbes
*Attorney, Agent, or Firm*—Hill, Steadman & Simpson

[57] ABSTRACT

A field-control coating, particularly for shrink hoses, comprises polymer materials having electrically-conductive additives. The field-control coating is arranged on the inner surface of a shrink hose.

36 Claims, 1 Drawing Sheet

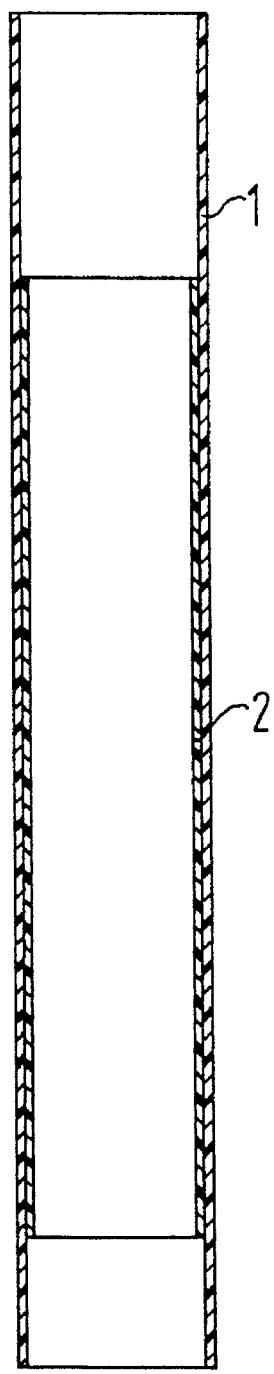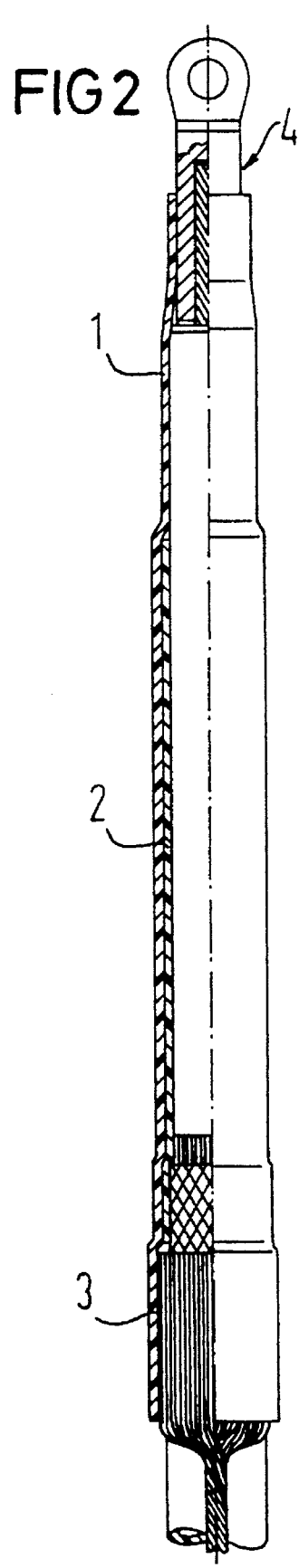

METHOD OF MAKING A FIELD CONTROL ELEMENT

This is a continuation of application Ser. No. 07/975,992, filed Nov. 13, 1992, now abandoned, which is a continuation of application Ser. No. 599,989, filed Oct. 9, 1990, now abandoned.

BACKGROUND OF THE INVENTION

1. Field of the Invention

The present invention relates to a field control coat of polymer material having electrically-conductive additives for medium voltage fittings.

2. Description of the Prior Art

Numerous field-controlling elements for cable fittings are known. A plurality of fillers are thereby employed as principal additives that form the field coating element in combination with a suitable polymer matrix and, potentially, other additives. For example, such fillers are inorganic substances having a high dielectric constant such as titanium (IV) compounds (titanium dioxide, barium titanate), electrically-conductive additives such as silicon carbide, carbon black, metal powder, as well as metal oxides, and semimetal oxides (zinc oxide, aluminum oxide, boron oxide, iron (II, III) oxide). Approximately 70% iron (II, III) oxide is therefore often employed as a principal additive, this being embedded in a polymer matrix of butyl rubber. This product is applied as an inner coating in a heat-shrinkable tube. Such a combination of materials, however, exhibits disadvantages given long-term use, particularly after the appearance of high transient overvoltages. The requirements thereafter are frequently no longer met.

A sealing compound of the above-mentioned type is provided as a field-controlling element for electrical field control in medium voltage fittings, this sealing compound being utilized as an inner coating in a shrink hose which, due to its composition, is in the position to avoid a disadvantageous stressing at the cable end by excessively-high field strengths.

This field-controlling coating must meet the following requirements:

For the purpose of a coating to be simply implemented, the field control coat must be formulated as a solvent-containing compound. The field-controlling coating forms from the coating in the hose by evaporation of the solvent that preferably has a low boiling point or, respectively, a high evaporation rate for this purpose;

At least at the shrinking temperature, the field-control coating must have or develop adequately-high stickiness in order to guarantee an adhesion to the cable surface. The activation temperature of the coating should lie at 90°–100° C.;

During the shrinking process, the compound must have adequate plasticity with good flow properties, so that the formation of bubbles or cavities can be prevented and a form-fitted connection to the substrate surface can be guaranteed;

The current-voltage characteristics should be non-linear with a steep rise of the curve at approximately 4 kV/cm, with the following guide lines

| Voltage (kV) | Current (µA) |
|---|---|
| 1 | 0.1 |
| 3–4 | 1–2 |
| 8 | up to 60; |

In particular the field-control coating, as a component part of a fitting, must pass the electrical tests of DIN 57 278/VDE 0278 (for example, for a 20 kV system) as set forth below Nominal power frequency withstand voltage (one minute withstand voltage of 55 kV), DC test (96 kV over 30 minutes), Nominal withstand surge voltage test (125 kV, 10 surges each of both polarities), Long-term AC voltage tests given cyclical current load (126 heating cycles, dry), Partial discharge measurement (free of partial discharge at 24 kV ($\leq 1$ pC), and Long-term tests (load change at 30 kV).

SUMMARY OF THE INVENTION

The object of the present invention, therefore, is to provide a field-control coating for medium voltage fittings that, in addition to the required conditions, also has a failure-free long-term behavior, whereby the electrical requirements as well as the softening behavior, the flow capability, the tackiness and the solubility should be improved on the basis of favorable raw material combination.

The above object is achieved, according to the present invention, in a field-control coating in that the polymer material is formed of a viscous, highly-sticky ethylene propylene "diene" terpolymer (EPDM) that is dissolved in a slightly unpolar solvent, in that the mean molecular weight of the EPDM amounts to 1000–15000, preferably 6000–8000, in that the diene part lies between 0 and 13, preferably between 4.5 and 9.5 weight percent, in that the ethylene-to-propylene ratio in the ethylene-propylene part lies between 40/60 and 75/25 weight percent, preferably between 43/57 and 54/46 weight percent, and in that the electrically-conductive additive is granulated silicon carbide having a grain size of F400–F320, whereby the weight part of the polymer material, without solvent, amounts to 10–40% and that of the electrically-conductive additive correspondingly amounts to 60–90%.

The selection of the raw materials for developing a field-control coating in accordance with the present invention including the inventive combination with a heat-shrinkable element for the formation of a field-controlling medium voltage fitting requires a careful matching. Thereby in the foreground, according to the object of the invention, is that the recipe must be simple to produce and with few constituents in order, among other things, to be able to also guarantee a reliable reproducibility in manufacture.

Silicon carbide is then employed as a principal additive for the field-control coating of the present invention, this material not having any magnetic properties and thereby having a comparatively better voltage stability after transient overvoltages than the known iron (II, III) oxide. As anticipated, the quantity portion of the silicon carbide, as well as the grain size thereof, are critical for the function of the field-control coating.

BRIEF DESCRIPTION OF THE DRAWING

Other objects, features and advantages of the invention, its organization, construction and operation will be best understood from the following detailed description, taken in conjunction with the accompanying drawings, on which:

FIG. 1 is a sectional view of a shrink hose before shrinking; and

FIG. 2 is a sectional view of the shrink hose after shrinking as employed as an end closure in medium voltage systems.

DESCRIPTION OF THE PREFERRED EMBODIMENTS

Referring first to the drawings, FIG. 1 illustrates a shrink hose 1 composed of a known shrink material at whose inner surface the field-control coating 2 of the present invention is applied, at least in the required, effective region.

FIG. 2 illustrates an end closure 4 for medium voltage systems, whereby the shrink hose 1 having the inwardly-disposed field-control coating 2 has been shrunk onto a cable end piece. A tracking-resistant adhesive 3, for example a commercially-available adhesive on the basis of polyisobutylene that is rendered tracking-resistant with suitable fillers, with which a sealing occurs is applied in the admission region onto the inside of the shrink hose 1.

A raw material that meets the following conditions is employed for the polymer matrix of the field-control coating 2 constructed in accordance with the present invention:

The polymer must be completely dissolved in commercially-available, relatively low-boiling solvent at room temperature;

The polymer must be capable of absorbing extremely great quantities of filler;

The highly-filled polymer must still develop adequate stickiness at 90°–100° C.; and After evaporation of the solvent from the coating material, the material must be adequately flexible and form a smooth surface (no formation of tracks due to brittleness of the dry compound).

A viscous, highly sticky ethylene propylene diene terpolymer (EPDM) or ethylene propylene copolymer (EPM) is then selected, according to the present invention, as the polymer in the form of a resin that meets the above-recited requirements. This polymer can be easily dissolved in unpolar solvents such as, for example, petroleum ether (boiling range 40°–60° C.) or other hydrocarbon solvents or, respectively, in chlorinated hydrocarbons such as 1.1.1-trichloroethane. The EP (D) M resins which come into consideration have mean molecular weights of 1000–15000, preferably 6000–8000. Dicyclopentadiene (DCP), ethylidene norbornene (EN) or 1.4-hexadiene can be used as the diene constituent. The diene portion in the resin lies between 0 and 13 weight percent, preferably at 4.5–9.5 weight percent, whereas the ethylene-to-propylene ratio in the EP part lies between 40/60 and 75/25 weight percent, preferably within the range of 43/57–54/46 weight percent. It has proven that a silicon carbide part between 60 and 90 weight percent, preferably 80 weight percent, is required for meeting the electrical requirements. F400–F320 are particularly suitable as grain sizes for the SiC.

A field-control coating constructed in accordance with the present invention has, for example, the following composition in the EP (D) M/SiC ratio:

40–10 weight percent Trilene 66;

60–90 weight percent silicon carbide "Carbogran™ dark" of Lonza-Werke GmbH, Waldshut, Germany, having the micrograin size F360 or F320.

The amount of solvent, for example 1.1.1-trichloroethane, is determined in accordance with the viscosity desired for the coating (approximately 30000 mPa·s/23° C.).

Coming into consideration as a polymer matrix in addition to pure EP (D) M liquid resin also mixtures thereof with other resins and/or rubbers that are compatible with trilene and are soluble in the mentioned solvents. Suitable polymers, for example, are other EP (D) M types with deviating molecular weight, polyisobutylene and butyl rubber, acrylate resins or, respectively, rubber, polybutylenes, atactic polypropylene, epichlorohydrine rubber.

Additional tackifying agents such as, for example, resin ester and derivatives thereof, tall resins, hydrocarbon resins and terpene-phenol resins can likewise be mixed into the polymer matrix.

In addition to the mentioned constituents, the field-control coating can contain one or more additives for improving the thermal-oxidative stability (antioxidants) such as, for example, Irganox 1010 or Irganox 1076.

According to the invention, the field-control coating is applied onto the inner surface of a shrink hose as set forth in greater detail in the two figures.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of manufacturing a field-control coating of polymer material with electrically-conductive additives for applying to medium voltage fittings, comprising the following steps:

using a solvent and a liquid polymer material including a viscous, highly sticky ethylene propylene diene terpolymer, the liquid polymer having a liquid state at room temperature and atmospheric pressure, and having a mean molecular weight in the range of 1000–15000 and dissolving the liquid polymer material in said solvent;

said diene part being in the range of 0–13 weight percent;

the ethylene-to-propylene ratio of the ethylene-propylene part being in the range of 40/60–75/25 weight percent;

adding an electrically-conductive additive including silicon carbide having a grain size in the range of F400–F320 and mixing the additive with said liquid polymer material and said solvent; and the weight ratio of the polymer material, without solvent, being in the range of 10–40% and that of the electrically-conductive additive being in the range of 60–90%.

2. The method of manufacturing a field-control coating of claim 1, wherein:

said polymer material is selected to have a mean molecular weight in the range of 6000–8000.

3. The method of manufacturing a field-control coating of claim 1, wherein:

said diene part is selected to have a weight percent in the range of 4.5–9.5.

4. The method of manufacturing a field-control coating of claim 1, wherein:

said ethylene-to-propylene ratio is selected in the range of 43/57–54/46 weight percent.

5. The method of manufacturing a field-control coating of claim 1, wherein:

the diene part comprises dicyclopentadiene.

6. The method of manufacturing a field-control coating of claim 1, wherein:

the diene part comprises ethylidene norborene.

7. The method of manufacturing a field-control coating of claim 1, wherein:

the diene part comprises 1.4-hexadiene.

8. The method of manufacturing a field-control coating of claim 1, wherein:

said solvent comprises petroleum ether having a boiling range of 40°–60° C.

9. The method of manufacturing a field-control coating of claim 1, wherein:

said solvent comprises a chlorinated hydrocarbon.

10. The method of manufacturing a field-control coating of claim 9, wherein:

said chlorinated hydrocarbon is 1.1.1-trichloroethane.

11. The method of manufacturing a field-control coating of claim 1, wherein:

said coating has a viscosity of substantially 30000 mPa·S/ 23° C.

12. The method of manufacturing a field-control coating of claim 1, comprising the further steps of:

adding at least one tackifying agent and mixing with said polymer material.

13. The method of manufacturing a field-control coating of claim 12, wherein:

said at least one tackifying agent comprises a material selected from the group consisting of resin ester and derivatives thereof.

14. The method of manufacturing a field-control coating of claim 12, wherein:

said at least one tackifying agent comprises a tall resin.

15. The method of manufacturing a field-control coating of claim 12, wherein:

said at least one tackifying agent comprises a hydrocarbon resin.

16. The method of manufacturing a field-control coating of claim 12, wherein:

said at least one tackifying agent comprises terpenephenol resin.

17. The method of manufacturing a field-control coating of claim 1, comprising the further steps of:

mixing a compatible polymer material with said polymer material.

18. The method of manufacturing a field-control coating of claim 17, wherein:

said compatible polymer material comprises polymer material selected from the group consisting of resins, rubbers and mixture thereof.

19. The method of manufacturing a field-control coating of claim 17, wherein:

said compatible polymer material has a molecular weight different from that of said polymer material.

20. The method of manufacturing a field-control coating of claim 17, wherein:

said compatible polymer material comprises polyisobutylene.

21. The method of manufacturing a field-control coating of claim 17, wherein:

said compatible polymer material comprises butyl rubber.

22. The method of manufacturing a field-control coating of claim 17, wherein:

said compatible polymer material comprises acrylic resin.

23. The method of manufacturing a field-control coating of claim 17, wherein:

said compatible polymer material comprises an acrylic rubber.

24. The method of manufacturing a field-control coating of claim 17, wherein:

said compatible polymer material comprises polybutene.

25. The method of manufacturing a field-control coating of claim 17, wherein:

said compatible polymer material comprises atactic polypropylene.

26. The method of manufacturing a field-control coating of claim 17, wherein:

said compatible polymer material comprises epichlorohydrine rubber.

27. The method of manufacturing a field-control coating of claim 1, comprising the further step of:

adding at least one antioxidant additive to improve the thermo-oxidative stability.

28. A method of manufacturing a field-control element comprising:

providing a shrinkable hose including an inner surface;

said inner surface comprising a pair of spaced end portions and an intermediate portion connecting said end portion; and applying a field-control coating on said intermediate portion of said inner surface, said coating comprising a solvent, a liquid polymer material including a viscous, highly sticky ethylene propylene diene terpolymer, the liquid polymer having a liquid state at room temperature and atmospheric pressure, the liquid polymer material dissolved in said solvent and having a means molecular weight in the range of 1000–15000, said diene part being in the range of 0–13 weight percent, the ethylene-to-propylene ratio of the ethylene-propylene part being in the range of 40/60–75/25 weight percent, an electrically-conductive additive including silicon carbide having a grain size in the range of F400–F320 mixed with said liquid polymer material and said solvent, and the weight of the polymer material, without solvent, being in the range of 10–40% and that of the electrically conductive additive being in the range of 60–90%.

29. The method of manufacturing a field-control element of claim 28, wherein:

said hose comprises a tracking-resistant, shrinkable hose.

30. The method of manufacturing a field-control element of claim 28, comprising the further step of:

an adhesive coating on at least one of said end portions of said inner surface.

31. The method of manufacturing a field-control element of claim 30, wherein:

said adhesive comprises a tracking-resistant, hot-melt adhesive.

32. The method of manufacturing a field-control element of claim 30, wherein:

said adhesive comprises a polyisobutylene based adhesive including fillers therein to provide creep resistance.

33. A method of manufacturing a medium voltage terminal structure comprising:

providing a terminal;

providing a cable including at least one conductor end portion connected to said terminal;

providing a heat-shrinkable hose shrunk onto said cable and said terminal and including an inner surface, said inner surface including a first end portion covering a portion of said cable, a second end portion covering a portion of said terminal and an intermediate portion connecting said first and second end portions and covering said at least one conductor end portion;

applying a tracking-resistant hot-melt adhesive coating on at least said first end portion of said inner surface bonding said hose to said cable; and applying a field-control coating on said intermediate portion of said inner surface, said field-control coating comprising 29.7 weight percent of a solvent, 21.1 weight percent liquid ethylene/propylene-terpolymer material the liquid ethylene/propylene-terpolymer having a liquid state at room temperature and atmospheric pressure, dissolved in said solvent, and an electrically-conductive additive including silicon carbide having a grain size in the range of F400–F320 mixed with said liquid ethylene/propylene-terpolymer material and said solvent.

34. The method of manufacturing a medium voltage terminal structure of claim 33, wherein:

said solvent preferably comprises 1.1.1-trichloroethane.

35. A method of manufacturing a field-control coating of polymer material with electrically-conductive additives for applying to medium voltage fittings, comprising the steps of:

providing a solvent;

providing a liquid ethylene propylene diene terpolymer, the liquid polymer having a liquid state at room temperature and atmospheric pressure, having a mean molecular weight in the range of 1000–15000 and mixing said liquid ethylene propylene diene terpolymer with said solvent;

mixing a silicon carbide filler with said liquid ethylene propylene diene terpolymer and said solvent; and the weight of the ethylene propylene diene terpolymer, without solvent, being in the range of 10 to 40% in that of the silicon carbide filler being in the range of 60 to 90%, compared to the weight of the ethylene propylene diene terpolymer and filler together.

36. The method of manufacturing a field control coating of claim 35, wherein the weight of the silicon carbide filler is 80% of the weight of the filler and ethylene propylene diene terpolymer together.

* * * * *